(12) United States Patent
Tamitsuji et al.

(10) Patent No.: US 8,240,172 B2
(45) Date of Patent: Aug. 14, 2012

(54) PROCESS FOR PRODUCTION OF SYNTHETIC QUARTZ GLASS

(75) Inventors: Chikaya Tamitsuji, Tokyo (JP); Kunio Watanabe, Tokyo (JP); Akio Koike, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/080,704

(22) Filed: Apr. 6, 2011

(65) Prior Publication Data

US 2011/0179827 A1    Jul. 28, 2011

Related U.S. Application Data

(63) Continuation of application No. PCT/JP2009/067273, filed on Oct. 2, 2009.

(30) Foreign Application Priority Data

Oct. 6, 2008   (JP) .................................. 2008-259711

(51) Int. Cl.
   *C03B 37/018*   (2006.01)
(52) U.S. Cl. .......................................... 65/397; 65/399
(58) Field of Classification Search ................. 65/397, 65/399
   See application file for complete search history.

(56) References Cited

U.S. PATENT DOCUMENTS

| | | | | |
|---|---|---|---|---|
| 3,798,875 A | * | 3/1974 | Morris | 95/38 |
| 4,629,485 A | * | 12/1986 | Berkey | 65/398 |
| 4,787,927 A | * | 11/1988 | Mears et al. | 65/390 |
| 5,158,587 A | * | 10/1992 | Kyoto et al. | 65/398 |
| 5,236,481 A | * | 8/1993 | Berkey | 65/399 |
| 5,342,809 A | * | 8/1994 | Poulain et al. | 501/12 |
| 5,679,125 A | * | 10/1997 | Hiraiwa et al. | 65/397 |
| 6,451,719 B1 | | 9/2002 | Yamagata | |
| 6,802,191 B2 | * | 10/2004 | Hazan et al. | 65/397 |
| 7,429,546 B2 | | 9/2008 | Iwahashi et al. | |
| 7,538,052 B2 | | 5/2009 | Iwahashi et al. | |
| 7,805,039 B2 | * | 9/2010 | Sanders et al. | 385/123 |
| 7,934,391 B2 | | 5/2011 | Tamitsuji et al. | |
| 2009/0122281 A1 | | 5/2009 | Iwahashi et al. | |

FOREIGN PATENT DOCUMENTS

| | | |
|---|---|---|
| JP | 2001-114529 | 4/2001 |
| JP | 2003-201124 | 7/2003 |
| JP | 2005-104820 | 4/2005 |
| JP | 2005-206452 | 8/2005 |
| JP | 2008-505043 | 2/2008 |

OTHER PUBLICATIONS

U.S. Appl. No. 13/078,426, filed Apr. 1, 2011, Tamitsuji, et al.
U.S. Appl. No. 13/078,427, filed Apr. 1, 2011, Tamitsuji, et al.
U.S. Appl. No. 13/040,646, filed Mar. 4, 2011, Tamitsuji, et al.
International Search Report issued Dec. 28, 2009 in PCT/JP09/067273 filed Dec. 16, 2009.

* cited by examiner

*Primary Examiner* — John Hoffmann
(74) *Attorney, Agent, or Firm* — Oblon, Spivak, McClelland, Maier & Neustadt, L.L.P.

(57) ABSTRACT

The present invention relates to a process for production of a synthetic quartz glass having a fluorine concentration of 1,000 mass ppm or more, the process comprising: (a) a step of depositing and growing quartz glass fine particles obtained by flame hydrolysis of a glass forming raw material onto a substrate, to thereby form a porous glass body; (b) a step of keeping the porous glass body in a reaction vessel that is filled with elemental fluorine ($F_2$) or a mixed gas comprising elemental fluorine ($F_2$) diluted with an inert gas and contains a solid metal fluoride, to thereby obtain a fluorine-containing porous glass body; and (c) a step of heating the fluorine-containing porous glass body to a transparent vitrification temperature, to thereby obtain a fluorine-containing transparent glass body.

18 Claims, No Drawings

PROCESS FOR PRODUCTION OF SYNTHETIC QUARTZ GLASS

CROSS-REFERENCE TO RELATED APPLICATIONS

This application is a continuation of PCT/JP09/67273 filed Oct. 2, 2009 and claims the benefit of JP 2008-259711 filed Oct. 6, 2008.

TECHNICAL FIELD

The present invention relates to a process for production of a synthetic quartz glass. More specifically, the invention relates to a process for production of a synthetic quartz glass having a fluorine concentration of 1,000 mass ppm or more. Hereinafter, unless otherwise indicated, ppm means mass ppm and % means % by mass.

Further, the present invention relates to a process for production of a $TiO_2$-containing synthetic quartz glass (hereinafter referred to as a "$TiO_2$—$SiO_2$ glass" in the present specification). More specifically, the invention relates to a process for production of a $TiO_2$—$SiO_2$ glass having a fluorine concentration of 1,000 ppm or more.

The synthetic quartz glass produced by the process of the present invention is suitable as an optical element and an optical member each being used for ultraviolet light, and an optical element and an optical member each having a controlled refractive index.

Furthermore, the $TiO_2$—$SiO_2$ glass produced by the process of the present invention is suitable as an optical member that is required to have an extremely low expansion property, and is particularly suitable as an optical system member of an exposure device for EUV lithography. The EUV (Extreme Ultra Violet) light as referred to in the invention refers to light having a wavelength range in a soft X-ray region or a vacuum ultraviolet region, and specifically refers to light having a wavelength of from about 0.2 to 100 nm.

BACKGROUND ART

Conventionally, in the photolithography technique, an exposure device for transferring a fine circuit pattern onto a wafer, and thereby producing an integrated circuit is widely utilized. With higher integration and higher functionalization of integrated circuits, the microsizing of the integrated circuit is advancing. The exposure device is hence required to form a circuit pattern with high resolution on a wafer in a deep focal depth, and shortening of the wavelength of the exposure light source is being advanced. The exposure light source is further advancing from conventional g-line (wavelength: 436 nm), i-line (wavelength: 365 nm) and a KrF excimer laser (wavelength: 248 nm), and an ArF excimer laser (wavelength: 193 nm) begins to be employed.

Furthermore, to respond to the next generation integrated circuit in which a line width of a circuit pattern is 70 nm or less, an immersion exposure technique and a double exposure technique, using an ArF excimer laser are considered to be effective. However, those techniques are estimated to merely cover up to the generation that the line width is 45 nm.

Under the foregoing technical trends, a lithography technique typically using, as an exposure light source, light having a wavelength of 13 nm among EUV lights (extreme ultraviolet light) is considered to be applicable over generations that a line width of a circuit pattern is 32 nm, and is attracting attention. The principle of image formation in the EUV lithography (hereinafter abbreviated as "EUVL") is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all reflecting optical systems.

The optical system member of an exposure device for EUVL is such as a photomask and a mirror, and is basically configured with (1) a substrate, (2) a reflective multilayer formed on the substrate, and (3) an absorber layer formed on the reflective multilayer. For the reflective multilayer, it is investigated to form an Mo/Si reflective multilayer in which an Mo layer and an Si layer are alternately laminated, and for the absorber layer, Ta and Cr are investigated as a forming material. For the substrate, a material having a low coefficient of thermal expansion is required so as not to generate a strain even under irradiation with EUV light, and a glass and the like having a low coefficient of thermal expansion is investigated.

A fluorine-containing synthetic quartz glass is proposed as a material having high initial transmission in respect to high power vacuum ultraviolet ray and having high durability (see Patent Document 1).

Furthermore, a $TiO_2$—$SiO_2$ glass which is a $TiO_2$-containing synthetic quartz glass is known as an extremely low thermal expansion material having a coefficient of thermal expansion (CTE) smaller than that of a quartz glass. Additionally, because the coefficient of thermal expansion can be controlled by $TiO_2$ content in the glass, a zero expansion glass having a coefficient of thermal expansion close to zero is obtained. Therefore, the $TiO_2$—$SiO_2$ glass has the possibility as a material used in an optical system member of an exposure device for EUVL.

Patent Document 2 proposes a $TiO_2$-containing silica glass having a fictive temperature of 1,200° C. or lower and a fluorine concentration of 100 ppm or more as a material extremely suitable for a material of a member constituting an optical system used in EUVL where the glass is a fluorine-containing $TiO_2$—$SiO_2$ glass in which a coefficient of thermal expansion at 0 to 100° C. is 0±200 ppb/° C., and changes in a coefficient of thermal expansion with temperature is small, that is, a temperature range in which a coefficient of thermal expansion is nearly zero is broad, and in which homogeneity of a coefficient of thermal expansion and mechanical properties in the glass is excellent.

Production processes of a fluorine-containing synthetic quartz glass and a fluorine-containing $TiO_2$—$SiO_2$ glass include the following several methods.

(1) One method is that a porous glass body is obtained, in a soot process, by depositing and growing quartz glass fine particles (soot) that is obtained by flame hydrolyzing glass forming materials. There is a production processes of obtaining a fluorine-containing glass body by treating the obtained porous glass body in a fluorine-containing atmosphere to introduce the fluorine into the porous glass body, and thereafter, heating the porous glass body to a transparent vitrification temperature or higher, thereby transparent-vitrifying the porous glass body. The soot process includes an MCVD process, an OVD process and a VAD process, depending on the preparation manner. In the case of producing a fluorine-containing $TiO_2$—$SiO_2$ glass, $TiO_2$—$SiO_2$ glass fine particles (soot) obtained by flame hydrolyzing or heat decomposing an Si precursor and a Ti precursor each serving as a glass forming raw material are deposited and grown, thereby obtaining a porous $TiO_2$—$SiO_2$ glass body.

(2) As the soot process, there are production processes, in which fluorine-containing materials are used as glass forming raw materials or the glass forming materials are subjected to flame hydrolysis or thermal decomposition in a fluorine-containing atmosphere to obtain a fluorine-containing porous glass body, and thereafter, a fluorine-containing $TiO_2$—$SiO_2$ is obtained.

(3) There is a production process for obtaining a fluorine-containing $TiO_2$—$SiO_2$ glass body, in a direct process, by using fluorine-containing materials as glass forming raw materials, or hydrolyzing or oxidizing glass forming raw materials in an oxyhydrogen flame of from 1,800 to 2,000° C. in a fluorine-containing atmosphere.

Of the above production processes, the process that the producing is easy and fluorine can relatively uniformly be introduced is the process (1). However, even in the process (1), there are the following problems: the temperature during treating a porous glass body in a fluorine-containing atmosphere is required to be high temperature of 400° C. or higher in order to introduce 1,000 ppm or more of fluorine and therefore O ring is required to be cooled with water in order to secure gas tightness of a furnace, and this makes the apparatus complicated; and in the case that a porous glass body has a large size, a size of an electric furnace needs to be increased, and this makes the facility constructions difficult.

Furthermore, variation of fluorine introduction amount due to variation of temperature, turbulence of gasflow and the like is generated. If the variation of the fluorine introduction amount is increased, in the case of using as, for example, an optical system member of an exposure device for EUVL, variation of a coefficient of thermal expansion is generated in the plane of the glass, and as a result, there is a problem that the resolution in the exposure decreases.

PRIOR ART DOCUMENT

Patent Document

Patent Document 1: JP-A-2001-114529
Patent Document 2: JP-A-2005-104820

SUMMARY OF THE INVENTION

Problem that the Invention is to Solve

To solve the above-described problems of the conventional techniques, the present invention has an object to provide a process for production of a synthetic quartz glass, in which a procedure of introducing fluorine into a porous glass can be carried out at low temperature of 200° C. or lower, and which can produce a synthetic quartz glass having a fluorine concentration of 1,000 ppm or more.

Furthermore, the present invention has an object to provide a process for production of a $TiO_2$—$SiO_2$ glass, in which a procedure of introducing fluorine into a porous $TiO_2$—$SiO_2$ glass can be carried out at low temperature of 200° C. or lower, and which can produce a $TiO_2$—$SiO_2$ glass having a fluorine concentration of 1,000 ppm or more.

Means for Solving the Problems

As a result of intensive investigations to achieve the above objects, the present inventors confirmed that when elemental fluorine ($F_2$) having higher reactivity is used in place of $SiF_4$, which is used as a fluorine source in treating a porous glass body in a fluorine-containing atmosphere in the Examples of Patent Document 1, 1,000 ppm or more of fluorine can be introduced into the porous glass body at low temperature of 200° C. or lower.

However, they confirmed that when the elemental fluorine ($F_2$) is used as a fluorine source, fluorine is eliminated from the glass body at the time of the subsequent treatment where the porous glass body is heated to a transparent vitrification temperature to form a transparent glass body, and the fluorine concentration after the transparent vitrification is remarkably decreased.

As a result of further intensive investigations, the present inventors have reached the following conclusion regarding the above finding for the case of using elemental fluorine ($F_2$) as a fluorine source.

The porous glass body involves structurally unstable sites among the Si—O bonds in $SiO_2$ network constituting the porous glass body as well as sites having unstable functional groups such as Si—OH. By bringing elemental fluorine ($F_2$) having reactivity higher than that of $SiF_4$ into contact with those bonds, the formation of Si—F bonds is accelerated. As a result, it is possible to introduce 1,000 ppm or more of fluorine into the porous glass body at low temperature of 200° C. or lower.

On the other hand, at the time of the transparent vitrification of a fluorine-introduced porous glass body, if a proton source such as $H_2O$ or Si—OH is present in a reaction field, the proton source serves as a starting point, and HF is generated by the reaction shown below and is eliminated from the glass body.

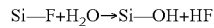

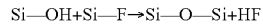

In addition, at the time of the transparent vitrification of the porous glass body, HF also reacts with a relatively stable Si—O—Si network, and cuts, for example, O—Si network of Si—O—$SiF_3$, thereby forming low molecular weight compounds such as $SiF_4$ and $SiF_3OH$. Those low molecular weight compounds gasify during the transparent vitrification, and is therefore eliminated from a reaction field. It is considered that fluorine introduced into the glass body is decreased by those actions. It is therefore considered that the amount of fluorine eliminated from the glass body during the transparent vitrification can be reduced by decreasing a proton source present in the inside of the porous glass body.

To achieve both the introduction of fluorine at low temperature and the reduction in the amount of fluorine eliminated from a glass body during the transparent vitrification, it is considered appropriate to form a large amount of Si—OH bond at the stage of a porous glass body and to reduce a proton source in the porous glass body by treating the porous glass body in a fluorine-containing atmosphere. However, in the case of using elemental fluorine ($F_2$) as a fluorine source, HF is necessarily generated by the following reaction in connection with the elemental fluorine ($F_2$). This HF reacts with a stable Si—O—Si network of a porous glass body, and Si—OH is again formed. Therefore, Si—OH serving as a proton source is almost permanently present in the inside of the porous glass body.

Generation Reaction of HF

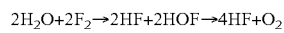

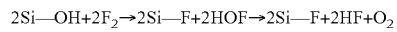

From the foregoing points, the present inventors have found that the amount of fluorine eliminated during the transparent vitrification of a fluorine-introduced porous glass body can be reduced by positively removing HF generated in a reaction field at the time when a porous glass body is treated in an elemental fluorine ($F_2$)-containing atmosphere. In other words, by positively removing HF generated in the reaction field, formation of Si—OH serving as a proton source can be suppressed in a porous glass body and the proton source present in the inside of the porous glass body can be decreased. This makes it possible to reduce the amount of fluorine eliminated during the transparent vitrification of a fluorine-introduced porous glass body.

The present invention is based on the foregoing findings, and provides a process for production of a synthetic quartz glass having a fluorine concentration of 1,000 mass ppm or more, the process comprising:

(a) a step of depositing and growing quartz glass fine particles obtained by flame hydrolysis of a glass forming raw material onto a substrate, to thereby form a porous glass body;

(b) a step of keeping the porous glass body in a reaction vessel that is filled with elemental fluorine ($F_2$) or a mixed gas comprising elemental fluorine ($F_2$) diluted with an inert gas and contains a solid metal fluoride, to thereby obtain a fluorine-containing porous glass body; and (c) a step of heating the fluorine-containing porous glass body to a transparent vitrification temperature, to thereby obtain a fluorine-containing transparent glass body (hereinafter, the process is referred to as "the production process of a synthetic quartz glass of the present invention").

Further, the present invention provides a process for production of a $TiO_2$-containing silica glass having a fluorine concentration of 1,000 mass ppm or more, the process comprising:

(a) a step of depositing and growing $TiO_2$—$SiO_2$ glass fine particles obtained by flame hydrolysis of an Si precursor and a Ti precursor each serving as a glass forming raw material onto a substrate, to thereby form a porous $TiO_2$—$SiO_2$ glass body;

(b) a step of keeping the porous $TiO_2$—$SiO_2$ glass body in a reaction vessel that is filled with elemental fluorine ($F_2$) or a mixed gas comprising elemental fluorine ($F_2$) diluted with an inert gas and contains a solid metal fluoride, to thereby obtain a fluorine-containing porous $TiO_2$—$SiO_2$ glass body; and (c) a step of heating the fluorine-containing porous $TiO_2$—$SiO_2$ glass body to a transparent vitrification temperature, to thereby obtain a fluorine-containing transparent $TiO_2$—$SiO_2$ glass body (hereinafter, the process is referred to as "the production process of a $TiO_2$—$SiO_2$ glass of the present invention").

Hereinafter, in the present description, the production process of a synthetic quartz glass of the present invention and the production process of a $TiO_2$—$SiO_2$ glass of the present invention may be collectively referred to as "the production process of the present invention".

In the production process of the present invention, it is preferred that the solid metal fluoride is sodium fluoride.

It is preferred that the production process of the present invention further comprises a step of subjecting the inside of the reaction vessel to a degassing treatment before filling the inside of the reaction vessel with elemental fluorine ($F_2$) or a mixed gas obtained by diluting elemental fluorine ($F_2$) with an inert gas in the step (b).

It is preferred that the production process of the present invention further comprises a step of presintering the porous $TiO_2$—$SiO_2$ glass body at from 1,100 to 1,350° C. between the step (a) and the step (b).

Effect of the Invention

According to the production process of the present invention, since the procedure of introducing fluorine in a porous glass body can be carried out at low temperature of 200° C. or lower, the problem in the conventional technique upon producing a synthetic quartz glass (or a $TiO_2$—$SiO_2$ glass) having a fluorine concentration of 1,000 ppm or more can be solved. That is, it can solve the problems that: an O ring must be cooled with water in order to secure gas tightness of a furnace, and this makes an apparatus complicated; and in the case that a porous glass body has a large size, a size of an electric furnace needs to be increased, and this makes the facility constructions difficult.

Furthermore, variation of fluorine introduction amount due to variation of a temperature, turbulence of gasflow and the like is solved. Therefore, according to the production process of the present invention, a synthetic quartz glass (or a $TiO_2$—$SiO_2$ glass) having a fluorine concentration of 1,000 ppm or more and having extremely small variation of the fluorine concentration can be produced.

MODE FOR CARRYING OUT THE INVENTION

The production process of the present invention includes steps (a) to (c) described below.

Step (a)

Quartz glass fine particles obtained by flame hydrolysis of glass forming raw materials are deposited and grown onto a substrate to form a porous glass body. Si precursor serving as a glass forming raw material is not particularly limited so long as it is a raw material capable of being gasified. The Si precursor includes silicon halide compounds, e.g., chlorides such as $SiCl_4$, $SiHCl_3$, $SiH_2Cl_2$ and $SiH_3Cl$, fluorides such as $SiF_4$, $SiHF_3$ and $SiH_2F_2$, bromides such as $SiBr_4$ and $SiHBr_3$, iodides such as $SiI_4$; and alkoxysilanes represented by $R_nSi(OR)_{4-n}$ (wherein R is an alkyl group having 1 to 4 carbon atoms, R's may be the same or different, and n is an integer of 0 to 3).

As the substrate, a quartz glass-made target (for example, a seed rod described in JP-A-63-24973) can be used. Further, the substrate is not limited to a rod shape, and a plate-shaped substrate may be used.

In the case of producing a $TiO_2$—$SiO_2$ glass, in the present step, $TiO_2$—$SiO_2$ glass fine particles obtained by flame hydrolysis of an Si precursor and a Ti precursor each serving as a glass forming raw material are deposited and grown onto a substrate to form a porous $TiO_2$—$SiO_2$ glass body.

Hereinafter, the term "porous glass body" described in the present description is intended to mean both a porous glass body free from $TiO_2$ and a porous $TiO_2$—$SiO_2$ glass body.

The Si precursor and the Ti precursor each serving as a glass forming raw material are not particularly limited so long as those are raw materials capable of being gasified. The Si precursor can use the materials described above. On the other hand, the Ti precursor includes titanium halide compounds such as $TiCl_4$ and $TiBr_4$; and alkoxytitanium represented by $R_nTi(OR)_{4-n}$ (wherein R is an alkyl group having 1 to 4 carbon atoms, R's may be the same or different, and n is an integer of 0 to 3). Furthermore, compounds containing Si and Ti such as silicon titanium double alkoxide can be used as the Si precursor and the Ti precursor.

Step (b)

The porous glass body obtained in step (a) above is kept in a reaction vessel that is filled with elemental fluorine ($F_2$) or a mixed gas comprising elemental fluorine ($F_2$) diluted with an inert gas and contains a solid metal fluoride. Thus, a fluorine-containing porous glass body is obtained.

In step (b), elemental fluorine ($F_2$) is used as a fluorine source for introducing fluorine into the porous glass body. The elemental fluorine ($F_2$) may be used as a mixed gas diluted with an inert gas, that is, a gas inert against reactions which occur at the time of introducing fluorine into the porous glass body.

The inert gas used in the mixed gas specifically includes nitrogen gas, and a rare gas such as helium gas or argon gas. However, where water is contained in the inert gas, there is the possibility that water reacts with the elemental fluorine ($F_2$) at the time of using it in a mixed gas, and hydrogen fluoride is formed. Therefore, care must be taken. From this standpoint, the dew point of the inert gas is preferably −10° C. or lower, more preferably −40° C. or lower, and particularly preferably −60° C. or lower.

From the standpoints of easiness of reaction control and economical efficiency, the elemental fluorine ($F_2$) is preferably used as a mixed gas obtained by diluted with an inert gas, and particularly preferably used as a mixed gas obtained by diluting the elemental fluorine ($F_2$) with nitrogen gas.

In the case that the elemental fluorine ($F_2$) is used as a mixed gas obtained by diluted with nitrogen gas, from the standpoints of easiness of reaction control and economical efficiency, the concentration of the elemental fluorine ($F_2$) is preferably from 100 mol ppm to 50 mol %, and more preferably from 1,000 mol ppm to 20 mol %. When the concentration of the elemental fluorine ($F_2$) is too low, a rate of introducing fluorine into the porous glass body decreases, and the treatment time is prolonged. On the other hand, when the concentration of the elemental fluorine ($F_2$) is too high, a rate of introducing fluorine into the porous glass substrate is accelerated and the reaction control becomes difficult.

As described above, highly reactive elemental fluorine ($F_2$) is suitable as the fluorine source at the introduction of fluorine into a porous glass body, and makes it possible to obtain a porous glass body containing 1,000 ppm or more of fluorine at low temperature of 200° C. or lower.

However, the case of using the elemental fluorine ($F_2$) as a fluorine source involves a reaction of generating HF. Therefore, there is the problem that Si—OH serving as a proton source is newly formed in the porous glass body. As a result, Si—OH serving as a proton source is always present in the inside of the porous glass body, and there is the problem that fluorine introduced is eliminated at the time of the transparent vitrification of the porous glass body.

In step (b), owing to keeping the porous glass body in a reaction vessel that is filled with elemental fluorine ($F_2$) or a mixed gas comprising elemental fluorine ($F_2$) diluted with an inert gas and contains a solid metal fluoride, HF generated in the reaction field is adsorbed on the solid metal fluoride. Thereby, in the porous glass body, the new generation of Si—OH can be suppressed and a proton source in the porous glass body can be reduced. As a result, the fluorine introduced into the porous glass body in this step is prevented from elimination at the time of transparent-vitrifying the porous glass body in step (c) to be subsequently carried out.

The solid metal fluoride used is not particularly limited, and is preferably one selected from the group consisting of alkali metal fluorides, alkaline earth metal fluorides and mixtures thereof. Of those, sodium fluoride is particularly preferred. The form of the solid metal fluoride is not particularly limited, and any form suitable for disposing it in the reaction vessel can be selected.

In step (b), the temperature of the reaction vessel is not particularly limited. However, as the temperature in the reaction vessel becomes low, the HF adsorbing ability of the solid metal fluoride is enhanced, so that it is preferred. From this standpoint, the temperature is preferably 200° C. or lower, more preferably 150° C. or lower, and further preferably 100° C. or lower. On the other hand, as the temperature becomes high, the diffusion of fluorine into the inside of the porous glass body easily proceeds, and as the temperature in the reaction vessel becomes high, the introduction reaction time of fluorine into the porous glass body becomes short, so that it is preferred. From this standpoint, the temperature is preferably −50° C. or higher, more preferably 0° C. or higher, and further preferably 20° C. or higher. Furthermore, the temperature in the reaction vessel may be changed with time, for example, by increasing the temperature at the initial stage of the reaction, thereby shortening the introduction reaction time of fluorine, and by decreasing the temperature at the end stage of the reaction, thereby accelerating adsorption of HF into the solid metal fluoride.

In step (b), the pressure in the reaction vessel is not particularly limited. However, in order to adsorb HF efficiently, it is preferred to accelerate the diffusion of HF from the inside of the porous glass. From this standpoint, it is preferred the lower pressure in the reaction vessel. The pressure in the reaction vessel is preferably 1 MPa or lower, more preferably 0.6 MPa or lower, and further preferably 0.3 MPa or lower, as a gauge pressure.

On the other hand, when the inside of the reaction vessel becomes reduced pressure, there is a possibility that the outside air is sucked into the reaction vessel. Since water, volatile organic substances and the like, contained in the outside air react with elemental fluorine ($F_2$) to generate HF, it is preferred to avoid the suction of the outside air, From this standpoint, the pressure in the reaction vessel is preferably 0 MPa or higher as a gauge pressure.

In the reaction vessel, the time period for bringing elemental fluorine ($F_2$) into contact with the porous glass body is preferably from 1 minute to 1 week and particularly preferably from 10 minutes to 2 days.

In step (b), the shape of the reaction vessel is not particularly limited, and the conventional reaction vessels can be used. Specifically, from the standpoint that the contact between a gas of elemental fluorine ($F_2$) and the porous glass body can be efficiently conducted, an internal-stirring type tank reactor having stirring blades inside the reaction vessel, a continuous tank reaction vessel (CSTR) that can continuously feed and exhaust the elemental fluorine ($F_2$), a piston flow type reaction vessel (PFR) and the like are preferably used.

Moreover, the reaction vessel used in step (b) is preferably that the inner wall and the internal facility thereof are constituted of a material having corrosion resistance against the elemental fluorine ($F_2$). In addition, the material is preferably a material which does not generate gaseous impurities in step (b), or may generate any gaseous material and the gaseous material does not become impurities. This is because if an element constituting the reaction vessel is incorporated as an impurity into a synthetic quartz glass (or a $TiO_2$—$SiO_2$ glass), there is a possibility that optical properties such as haze or physical properties such as thermal linear expansion are deteriorated. Specifically, metals such as nickel, copper and iron, alloys such as stainless steel (SUS316), monel, inconel and hastelloy, glasses such as synthetic quartz glass and soda lime glass, metal halides such as calcium fluoride and nickel fluoride, perhalogenated resins such as polytetrafluoroethylene, tetrafluoroethylene-perfluoro (alkyl vinyl ether) copolymer and polychlorotrifluoroethylene, and the like can be suitably utilized as an inner wall and an internal facility of the reaction vessel.

Furthermore, in step (b), since fluorine can be uniformly introduced into the porous glass body in a short period of time, it is preferred that a degassing treatment is carried out with keeping the inside of the reaction vessel having the porous glass body disposed therein under reduced pressure (preferably 13,000 Pa or lower, and particularly 1,300 Pa or lower), and then the elemental fluorine ($F_2$) or a mixed gas comprising the elemental fluorine ($F_2$) diluted with an inert gas is introduced until a prescribed pressure is attained.

In this connection, in step (b), water and volatile organic substances present in the reaction vessel can be removed by carrying out a degassing treatment with keeping the inside of the reaction vessel having the porous glass body disposed therein under reduced pressure. This can prevent the generation of hydrogen fluoride through the reaction of elemental fluorine with the water or the volatile organic substances. Furthermore, in order to conduct the degassing treatment efficiently, heating is preferred. The heating temperature is preferably from 30° C. to 300° C., more preferably from 50° C. to 200° C., and particularly preferably from 60° C. to 150° C.

Furthermore, between step (a) and step (b), it is preferred to carry out presintering in order to increase the bulk density of the porous glass body.

It is considered that Si—OH is present on the surface of particle at the stage of the porous glass body. It is considered that as the bulk density is increased, the specific surface area of particle is decreased and the amount of Si—OH present in the porous glass body is relatively decreased. That is, it is considered that as the bulk density of the porous glass body is increased, the amount of Si—OH present in the porous glass body is decreased and the amount of HF generated at the time when elemental fluorine ($F_2$) is brought into contact with the porous glass body is relatively decreased. As a result, it is considered that the elimination of fluorine in step (c) to be subsequently carried out can be suppressed.

In the case that the presintering is conducted for such a purpose, it is preferred that the presintering is carried out at a temperature of 1,100° C. or higher.

When the temperature is lower than 1,100° C., there is concern that sintering of the particles does not proceed and the bulk density does not change. The temperature is more preferably 1,150° C. or higher.

On the other hand, it is preferred that the presintering is carried out at a temperature of 1,350° C. or lower. Where the presintering temperature is too high, the presintering excessively proceeds and closed pores are present. As a result, there is concern that variation in the fluorine concentration occurs when fluorine is introduced into the porous glass body in step (b), bubbles remain after the transparent vitrification in step (c), or the amount of Si—OH is remarkably decreased, thereby the reaction with the elemental fluorine ($F_2$) becomes slow. The temperature is more preferably 1,300° C. or lower.

The keeping time period of the presintering treatment varies depending on the treatment temperature, but the treatment for from several ten minutes to several ten hours is preferred.

The bulk density of the porous glass body after the presintering is preferably 0.1 g/cm³ or more. Where the bulk density is too small, the specific surface area of the particle is increased and the amount of OH is increased. As a result, the elimination of fluorine at the time of the transparent vitrification in step (c) cannot be suppressed and it is difficult to make the transparent glass body having the fluorine concentration of 1,000 ppm or more. The bulk density of the porous glass body after the presintering is more preferably 0.2 g/cm³ or more, further preferably 0.25 g/cm³ or more, and particularly preferably 0.3 g/cm³ or more.

On the other hand, the bulk density of the porous glass body after the presintering is preferably 1.0 g/cm³ or less. Where the bulk density is too large, closed pores are present. As a result, there is concern that variation in the fluorine concentration occurs at the introduction of fluorine into the porous glass body in step (b) and bubbles remain after the transparent vitrification in step (c). The bulk density of the porous glass body after the presintering is more preferably 0.8 g/cm³ or less and particularly preferably 0.6 g/cm³ or less.

Step (c)

The fluorine-containing porous glass body obtained in step (b) is subjected to temperature increase to a transparent vitrification temperature, thereby obtaining a fluorine-containing transparent glass body. The transparent vitrification temperature is generally from 1,350 to 1,800° C., and preferably from 1,400 to 1,750° C.

The atmosphere is preferably an atmosphere of 100% of an inert gas such as helium or argon, or an atmosphere containing an inert gas such as helium or argon as a main component. The pressure may be reduced pressure or normal pressure. In the case of the reduced pressure, the pressure is preferably 13,000 Pa or less. The keeping time period of step (c) varies depending on the treatment temperature, but the treatment for from several ten minutes to several ten hours is preferred.

Furthermore, as necessary, subsequent to step (c), forming step (step (d)) and annealing step (step (e)) may be carried out. In this case, both step (d) and step (e) may be carried out, and any one of step (d) and step (e) may be carried out.

Step (d)

The fluorine-containing transparent glass body obtained in step (c) is subjected to heating to a temperature of the softening point or higher and formed into a desired shape, thereby obtaining a fluorine-containing formed glass body. The forming temperature is preferably from 1,500 to 1,800° C. When the temperature is 1,500° C. or higher, the viscosity is sufficiently lowered so that the fluorine-containing formed glass body deforms due to substantially its own weight. Furthermore, the growth of cristobalite which is crystal phase of $SiO_2$ (in the case of a $TiO_2$—$SiO_2$ glass body, further, growth of rutile or anatase which is crystal phase of $TiO_2$) is difficult to occur, whereby the occurrence of so-called devitrification can be prevented. At a temperature of 1,800° C. or lower, sublimation of $SiO_2$ can be suppressed.

In the case of carrying out step (d), step (c) and step (d) can be carried out continuously or simultaneously.

Step (e)

The formed glass body obtained in step (d) is kept at a temperature of from 600 to 1,200° C. for 1 hour or more, and then subjected to annealing treatment in which the temperature is decreased to 500° C. or lower at an average temperature decreasing rate of 10° C./hr or less, thereby controlling a fictive temperature of the glass. Alternatively, the formed glass body obtained in step (d) at 1,200° C. or higher is subjected to annealing treatment in which the temperature is decreased to 500° C. or lower at an average temperature decreasing rate of 60° C./hr or less, thereby controlling a fictive temperature of the glass. After decreasing the temperature to 500° C. or lower, the formed glass body can be allowed to stand for natural cooling. The atmosphere in this case is preferably an atmosphere of 100% of an inert gas such as helium, argon or nitrogen, an atmosphere comprising those inert gases as a main component, or an air atmosphere. The pressure is preferably reduced pressure or normal pressure.

To achieve lower fictive temperature, it is effective to cool during a temperature region near an annealing point and a strain point of the glass at slower cooling rate. Specifically, in the cooling profile of step (e), the slowest cooling rate is preferably 10° C./hr or less, more preferably 5° C./hr or less, further preferably 3° C./hr or less, and particularly preferably 2° C./hr or less.

By the above procedures, a synthetic quartz glass and a TiO$_2$—SiO$_2$ glass each having a fluorine concentration of 1,000 ppm or more, preferably 3,000 ppm or more, more preferably 5,000 ppm or more, and particularly preferably 7,000 ppm or more can be manufactured. The fluorine concentration is obtained with an FP method (fundamental parameter method) using samples having known fluorine concentrations by means of fluorescent X-ray.

According to the process of the present invention, a synthetic quartz glass and a TiO$_2$—SiO$_2$ glass each having extremely small variation of a fluorine concentration, that is, extremely small variation width ΔF of a fluorine concentration, can be produced.

The synthetic quartz glass and the TiO$_2$—SiO$_2$ glass produced by the process of the present invention each has the variation width ΔF of the fluorine concentration preferably within ±10%, more preferably within ±8%, further preferably within ±5%, and particularly preferably within ±3%, to the average value of the fluorine introduction amount. For example, in the case of a TiO$_2$—SiO$_2$ glass having a fluorine introduction amount of 1,000 ppm, the fluorine introduction amount is preferably within a range of from 900 ppm to 1,100 ppm and particularly preferably within a range of from 970 ppm to 1,030 ppm.

In this connection, the variation width ΔF of the fluorine concentration of the formed synthetic quartz glass body or the formed TiO$_2$—SiO$_2$ glass body obtained through step (d) and step (e) can be measured by, for example, the following procedures.

In the cylindrical formed synthetic quartz glass body or formed TiO$_2$—SiO$_2$ glass body formed to have a diameter of about 85 mm and a thickness of 50 mm by grinding the outer peripheral portion thereof, two points obtained by moving two intersections between an optional diameter and a circumference on the bottom of the cylinder toward the center by about 6 mm, are taken as point A and point B, respectively. The glass body is sliced along the planes passing the point A and the point B and each perpendicular to direction of the diameter (hereinafter referred to as plane A and plane B, respectively) to remove the outer peripheral portions. The resulting glass is further sliced along the planes perpendicular to the direction of the diameter with an interval of 12 mm toward the plane B from the plane A, thereby obtaining six glass pieces each having a thickness of 12 mm. To the obtained six glass pieces, six points of average fluorine concentrations on the surfaces at the same side to the plane A of the respective glass pieces and one point of an average fluorine concentration on the surface of the plane B, total seven points of fluorine concentrations, are obtained by fluorescent X-ray using samples having known fluorine concentrations with an FP method (fundamental parameter method). The fluorine concentration variation width (ΔF=±[difference between maximum value and minimum value]/2) in the whole formed synthetic quartz glass body or formed TiO$_2$—SiO$_2$ glass body is obtained from the average value of seven points of F concentrations obtained and the difference between the maximum value and the minimum value.

According to the process of the present invention, a synthetic quartz glass and a TiO$_2$—SiO$_2$ glass each having extremely small variation width (ΔTf) of a fictive temperature can be produced. The synthetic quartz glass and the TiO$_2$—SiO$_2$ glass produced by the process of the present invention each preferably has the variation width ΔTf of the fictive temperature within 50° C., more preferably within 30° C., further preferably within 15° C., and particularly preferably within 5° C.

In this connection, the variation width ΔTf of the fictive temperature of the formed synthetic quartz glass body or the formed TiO$_2$—SiO$_2$ glass body, obtained through step (d) and step (e) can be measured by, for example, the following procedures.

Glass pieces are collected from two sites in the central portion of a glass, two sites in the outer peripheral portion thereof and two sites in the intermediate portion thereof, respectively, and mirror polishing is carried out. The fictive temperatures of the mirror polished TiO$_2$—SiO$_2$ glasses are measured according to the following procedures. The respective fictive temperatures of the central portion, the intermediate portion and the outer peripheral portion are calculated by averaging the fictive temperatures of 2 points, and the variation width of the fictive temperature (ΔTf=[difference between maximum value and minimum value of average fictive temperature]) in the whole formed synthetic quartz glass body or formed TiO$_2$—SiO$_2$ glass body is obtained from the difference between the maximum value and the minimum value of those average fictive temperatures.

(Measurement Procedure of Fictive Temperature)

As for the fictive temperature, an absorption spectrum is obtained on a mirror-polished TiO$_2$—SiO$_2$ glass by using an infrared spectrophotometer (Magna 760, manufactured by Nikolet). On this occasion, the data interval is adjusted to about 1.0 cm$^{-1}$ and an average value after scanning 64 times is used for the absorption spectrum. In the thus obtained infrared absorption spectrum, the peak observed at around 2,260 cm$^{-1}$ is derived from harmonic of stretching vibration induced by the Si—O—Si bond of the TiO$_2$—SiO$_2$ glass. Using the peak position, a calibration curve is prepared by glasses whose fictive temperatures are known and which each has the same composition and then the fictive temperature is determined.

In the case of producing the TiO$_2$—SiO$_2$ glass by the process of the present invention, the TiO$_2$ content is preferably from 1 to 12% by mass. Where the TiO$_2$ content is less than 1% by mass, there is concern that zero expansion is not achieved. Where the TiO$_2$ content exceeds 12% by mass, there is a possibility that a coefficient of thermal expansion becomes negative. The TiO$_2$ content is more preferably from 3 to 10% by mass, and particularly preferably from 5 to 8% by mass.

In the case of producing the TiO$_2$—SiO$_2$ glass by the process of the present invention, the fictive temperature of the TiO$_2$—SiO$_2$ glass obtained is 1,200° C. or lower, preferably 1,100° C. or lower, and particularly preferably 1,000° C. or lower. Where the fictive temperature exceeds 1,200° C., the temperature range of zero-expansion is narrow, and there is concern for being insufficient for a material used as an optical material for an exposure device for EUVL. In order to expand the temperature range of zero expansion, the fictive temperature is preferably 950° C. or lower and more preferably 900° C. or lower.

The coefficient of thermal expansion can be adjusted by producing the TiO$_2$—SiO$_2$ glass by the process of the present invention, evaluating its coefficient of linear thermal expansion, and feeding back the result to a fluorine concentration, a TiO$_2$ content and a fictive temperature. For example, in the case that the TiO$_2$—SiO$_2$ glass of the present invention of which a temperature range of a coefficient of thermal expansion of 0±5 ppb/° C. is from 18 to 26° C. is changed so as to have the temperature range of from 18 to 40° C., the change can be achieved by increasing the fluorine concentration, decreasing the fictive temperature or decreasing the $TiO_2$ content.

EXAMPLES

The present invention is described in further detail below by reference to Examples, but the invention is not limited thereto.

Example 1

$TiO_2$—$SiO_2$ glass fine particles obtained by gasifying $TiCl_4$ and $SiCl_4$ each serving as a glass-forming raw material of a $TiO_2$—$SiO_2$ glass, respectively, then mixing those, and subjecting to heat hydrolysis (flame hydrolysis) in an oxyhydrogen flame were deposited and grown on a substrate, thereby forming a porous $TiO_2$—$SiO_2$ glass body having a diameter of about 80 mm and a length of about 100 mm (step (a)).

Since it is hard to handle the obtained porous $TiO_2$—$SiO_2$ glass body without any treatment, the porous $TiO_2$—$SiO_2$ glass body was kept in the air at 1,200° C. for 4 hours in a state still deposited on the substrate and then separated from the substrate.

The porous $TiO_2$—$SiO_2$ glass body was placed in an atmosphere-controllable electric furnace, and the pressure was reduced to about 1,000 Pa at room temperature. While a mixed gas of $He/SiF_4$=95/5 (volume ratio) was then introduced, the system was kept in this atmosphere at 1,000° C. under normal pressure for 1 hour, thereby introducing fluorine into the porous $TiO_2$—$SiO_2$ glass body (step (b')).

The fluorine concentration of the porous $TiO_2$—$SiO_2$ glass body having fluorine introduced therein by step (b') was measured by the following procedures.

100 mg of a sample was precisely weighed on a Pt dish. A 1 g of $Na_2CO_3$ and a 1 g of $K_2CO_3$ were added thereto, and a melt treatment was conducted for 1 minute and 30 seconds. After the melt treatment, a 10 ml of ion-exchanged water was added thereto. After heating on a water bath, the sample was adjusted to pH=7.0 with (1+1) HCl, and was adjusted to a constant volume of 100 ml with ion-exchanged water. The fluorine concentration in the constant-volume solution was determined with an F ion electrode.

Thereafter, the glass was heated to a transparent vitrification temperature (1,450° C.) in a 100% of He atmosphere and kept for 4 hours. The resulting glass was then transferred to a carbon furnace and heated to a temperature (1,700° C.) of a softening temperature or higher in an argon atmosphere and formed it into a cylindrical shape, thereby obtaining a formed $TiO_2$—$SiO_2$ glass body (step (c) and step (d)).

Subsequently, in the carbon furnace, the formed $TiO_2$—$SiO_2$ glass body obtained was allowed to stand for natural cooling from 1,700° C. in the furnace.

The fluorine concentration of the formed $TiO_2$—$SiO_2$ glass body obtained was measured with the same procedures as described above.

Example 2

A formed $TiO_2$—$SiO_2$ glass body was obtained in the same manner as in Example 1, except that the following step (b") was carried out in place of step (b').

Step (b")

The porous $TiO_2$—$SiO_2$ glass body was placed in an atmosphere-controllable electric furnace, and the pressure was reduced to about 1,000 Pa at room temperature. While a mixed gas of $He/SiF_4$=90/10 (volume ratio) was then introduced, the system was kept in this atmosphere at 25° C. under normal pressure for 1 hour, thereby introducing fluorine into the porous $TiO_2$—$SiO_2$ glass body.

Examples 3 to 12

Formed $TiO_2$—$SiO_2$ glass bodies were obtained in the same manner as in Example 1, except that the following step (b) was carried out in place of step (b').

Step (b)

The porous $TiO_2$—$SiO_2$ glass body obtained by the above procedures was supported with a PFA-made jig and was then placed in a nickel autoclave (A/C) (volume: 1 liter) together with the jig. Then, after 15 g of an NaF pellet (manufactured by Stella Chemifa Corporation) was inserted into the autoclave so as not to come into contact with the porous $TiO_2$—$SiO_2$ glass body, the system was heated from the outside of the autoclave by using an oil bath to increase the temperature to 80° C. from room temperature at a temperature increasing rate of from 0.5 to 2° C./min.

Thereafter, while the inside of the apparatus was kept at 80° C., vacuum degassing was carried out until the pressure in the apparatus reached an absolute pressure of 266 Pa or lower, and the system was kept for 1 hour (the case that degassing operation is carried out). This operation has the purpose of removing incorporated organic impurities, water and the like.

Then, a gas of elemental fluorine ($F_2$) diluted to the concentration shown in Table 1 with nitrogen gas (hereinafter referred to as "diluted fluorine gas") was introduced until the pressure in the apparatus reached a gauge pressure of 0.18 MPa.

After the temperature was increased to a temperature [° C.] shown in Table 1 at a rate in a range of from −2 to 2° C./min, the system was kept for a reaction time [hr] shown in Table 1, thereby introducing fluorine into the porous $TiO_2$—$SiO_2$ glass body. In this connection, the pressure (MPa) shown in Table 1 is a pressure when the temperature was increased to the temperature shown in Table 1.

Regarding Examples 3 to 10 and 12, a porous $TiO_2$—$SiO_2$ glass body having a bulk density of 0.3 $g/cm^3$ was used and was presintered at 1,230° C. for 3 hours in the air before subjecting to step (b). On the other hand, regarding Example 11, a porous $TiO_2$—$SiO_2$ glass body having a bulk density of 0.55 $g/cm^3$ was used and was presintered at 1,250° C. for 3 hours in the air before subjecting to step (b).

In this connection, the bulk densities of the porous glass bodies were calculated from the external shape and the weight.

Furthermore, the fluorine concentrations of glasses of Examples 10 to 12 were obtained by fluorescent X-ray using samples having known fluorine concentrations with an FP method (fundamental parameter method).

TABLE 1

| Run | Porous Glass Body | | | | | | | | | Formed Glass Body |
|---|---|---|---|---|---|---|---|---|---|---|
| | Bulk Density [g/cm$^3$] | Degassing Operation | Mass [g] | F$_2$ Concentration [mol %] | Temperature [° C.] | Pressure [MPa] | Reaction Time [hr] | Additive | F Introduction Amount [wt ppm] | F Introduction Amount [wt ppm] |
| Example 1 | | | | SiF$_4$ 5% | 1000 | 0 | 4 | | 11,000 | 3,400 |
| Example 2 | | | | SiF$_4$ 10% | 25 | 0 | 4 | | Unmeasured | 300-500 |
| Example 3 | 0.3 | None | 20.7 | 20% | 140 | 0.21 | 24 | | 21,000 | 19 |
| Example 4 | 0.3 | Carried out | 16.2 | 20% | 140 | 0.22 | 24 | | 93,000 | 470 |
| Example 5 | 0.3 | Carried out | 18.4 | 20% | 140 | 0.22 | 24 | NaF | 73,000 | 1,900 |
| Example 6 | 0.3 | Carried out | 74.2 | 20% | 140 | 0.23 | 24 | NaF | 23,000 | 3,200 |
| Example 7 | 0.3 | Carried out | 20.3 | 20% | 140 | 0.40 | 24 | NaF | 110,000 | 1,700 |
| Example 8 | 0.3 | Carried out | 21.4 | 20% | 170 | 0.27 | 8 | NaF | 60,000 | 2,700 |
| Example 9 | 0.3 | Carried out | 22.6 | 20% | 80 | 0.18 | 24 | NaF | 36,000 | 3,300 |
| Example 10 | 0.3 | Carried out | 95.2 | 20% | 80 | 0.18 | 24 | NaF | Unmeasured | 3,180 |
| Example 11 | 0.55 | Carried out | 149.0 | 20% | 80 | 0.18 | 24 | NaF | Unmeasured | 4,010 |
| Example 12 | 0.3 | None | 46.2 | 20% | 80 | 0.18 | 24 | NaF | Unmeasured | 2,940 |

It is seen from the results of Example 1 and Example 2 that in step (b') and step (b"), in the case of using SiF$_4$ as a fluorine source, when the treatment is conducted at a temperature of 1,000° C. or higher, the fluorine introduction amount in the formed glass body can be 1,000 ppm or more, but on the other hand, when the treatment is conducted at normal temperature (25° C.), the fluorine introduction amount in the formed glass body does not reach 1,000 ppm.

Moreover, in Examples 3 and 4 using elemental fluorine (F$_2$) as a fluorine source in step (b) without adding NaF having HF adsorbing ability, fluorine in an amount exceeding 10,000 ppm could be introduced into the porous glass body by the treatment at low temperature of 200° C. or lower, but at the stage where the formed glass body was obtained through the transparent vitrification, the fluorine introduction amount did not reach 1,000 ppm. This is considered due to, as described above, that HF generated in step (b) cannot be removed, residual proton source serves as a starting point, and the elimination of fluorine from a glass body is accelerated at the time of the transparent vitrification.

On the other hand, in each of Examples 5 to 12 where NaF having HF adsorbing ability was added, the fluorine introduction amount at the stage where a formed glass body was obtained exceeded 1,000 ppm.

In comparison among Example 5, Example 7 and Example 9, in which the mass of each sample is relatively near and the reaction time is the same, high fluorine introduction amount was achieved in Example 9 in which the reaction temperature and the reaction pressure are low. This is considered due to that NaF added has excellent HF adsorbing ability as the temperature is low. Furthermore, diffusion of HF from the porous glass body to the atmosphere becomes slow as the pressure during the fluorine treatment is high. From this fact, the elimination of fluorine during the transparent vitrification becomes larger in Example 7 than Example 5.

In comparison between Example 5 and Example 6, it is seen that the elimination of fluorine during the transparent vitrification tends to be suppressed as the mass of the porous glass body is large. It is considered that at the time of transparent vitrification, the outer portion of the porous glass body is heated in first to undergo densification, thereby disturbing the diffusion of fluorine from the inside of the glass body, and as a result, the elimination of fluorine from the inside of the glass body is suppressed. On the other hand, in Example 9 and Example 10, it is seen that although the mass of the porous glass body differs, the elimination of fluorine during the transparent vitrification can be suppressed equally. This is considered due to, as described above, that because step (b) was carried out at low temperature of 80° C., HF adsorbing ability of NaF added is high, and as a result, proton sources newly formed in the porous glass body is greatly decreased, and thereby the elimination of fluorine is sufficiently suppressed so that the degree of elimination of fluorine is equivalent between the outer peripheral portion and the inside of the porous glass body. This result suggests that according to the process of the present invention, a glass body having extremely small variation of a fluorine concentration can be produced.

Furthermore, in comparison between Example 10 and Example 11, it is seen that the elimination of fluorine during the transparent vitrification tends to be suppressed as the bulk density of the porous glass body is large.

Example 13

TiO$_2$—SiO$_2$ glass fine particles obtained by gasifying TiCl$_4$ and SiCl$_4$ each serving as a glass-forming raw material of TiO$_2$—SiO$_2$ glass, respectively, then mixing those, and subjecting to heat hydrolysis (flame hydrolysis) in an oxyhydrogen flame were deposited and grown on a substrate, thereby forming a porous TiO$_2$—SiO$_2$ glass body (step (a)).

Since it is hard to handle the obtained porous TiO$_2$—SiO$_2$ glass body without any treatment, the porous TiO$_2$—SiO$_2$ glass body was kept in the air at 1,200° C. for 4 hours in a state still deposited on the substrate and then separated from the substrate, thereby obtaining a porous TiO$_2$—SiO$_2$ glass body having a diameter of about 200 mm, a length of about 300 mm and a bulk density of 0.45 g/cm$^3$.

A 3.8 kg of the porous TiO$_2$—SiO$_2$ glass body obtained by the above procedures was supported with a SUS316L-made jig and was then placed in a SUS316L-made autoclave (A/C) (volume: 50 liters) together with the jig. Then, 300 g of an NaF pellet (manufactured by Stella Chemifa Corporation) was inserted into the autoclave so as not to come into contact with the porous TiO$_2$—SiO$_2$ glass body.

The system was heated from the outside of the autoclave by using a mantle heater to increase the temperature in the apparatus from room temperature to 80° C. at a temperature increasing rate ranging from 0.5 to 2° C./min. Thereafter, while the inside of the apparatus was kept at 80° C., vacuum degassing was conducted until the pressure in the apparatus reached an absolute pressure of 13,000 Pa or lower, and the system was kept for 1 hour. Thereafter, a gas of elemental fluorine (F$_2$) diluted to 20 mol % with nitrogen gas was introduced until the pressure in the apparatus reached a gauge pressure of 0.05 MPa, and the system was kept under the conditions of a temperature of 80° C. and a gauge pressure of 0.05 MPa for 6 hours.

Then, after the inside gas was purged to lower the pressure to atmospheric pressure and a gas of elemental fluorine ($F_2$) diluted to 20 mol % with nitrogen gas was passed through at a rate of 400 cc/min for 2 hours to renew the gas of elemental fluorine ($F_2$) in the apparatus, the pressure was elevated until the pressure in the apparatus reached a gauge pressure of 0.05 MPa, and the system was kept under conditions of a temperature of 80° C. and a gauge pressure of 0.05 MPa for 6 hours. The operation was further repeated twice, and the porous $TiO_2$—$SiO_2$ glass body and the gas of elemental fluorine ($F_2$) were kept under conditions of a temperature of 80° C. and a gauge pressure of 0.05 MPa for 24 hours in total (step (b)).

After the reaction, the weight of the porous $TiO_2$—$SiO_2$ glass body increased by 30 g as compared with the weight before the reaction, so that the introduction of fluorine was confirmed. Furthermore, the weight of the NaF pellet increased by 7 g as compared with the weight before the reaction, so that the adsorption of HF was confirmed.

Then, after the temperature was increased to the transparent vitrification temperature (1,450° C.) in He 100% atmosphere and the system was kept for 4 hours, the glass body was transferred to a carbon furnace and was then heated to a temperature (1,700° C.) of the softening point or higher in an argon atmosphere to form into a cylindrical shape, thereby obtaining a formed $TiO_2$—$SiO_2$ glass body (step (c) and step (d)).

The obtained glass was a columnar formed $TiO_2$—$SiO_2$ glass body having a diameter of 140 mm. The outer peripheral portion of the glass was ground to form a columnar glass having a diameter of 85 mm and a thickness of 50 mm. By the above-described method, in respect to the obtained six glass pieces each having a thickness of 12 mm, six points of fluorine concentrations on the surfaces at the same side to the plane A of the respective glass pieces and one point of an fluorine concentration on the surface of the plane B, total seven points of fluorine concentrations, were obtained by fluorescent X-ray using samples having known fluorine concentrations with an FP method (fundamental parameter method). As a result of obtaining fluorine concentration variation width ($\Delta F$) in the whole formed $TiO_2$—$SiO_2$ glass body from the maximum value and the minimum value of F concentration at seven points, the average F concentration was 6,600 ppm, the maximum value was 7,100 ppm, and the minimum value was 6,200 ppm. Thus, the variation width $\Delta F$ of the fluorine concentration was ±7% to the average value of the fluorine introduction amount.

Furthermore, variation width ($\Delta F$) of a fluorine concentration was obtained from the F concentrations in 5 points excluding the surface of the plane A and the surface of the plane B, among the obtained F concentration measurement results in 7 points. As a result, the average F concentration was 6,900 ppm, the maximum value was 7,100 ppm and the minimum value was 6,800 ppm. Thus, it was confirmed that the variation width $\Delta F$ of the fluorine concentration is ±2% to the average value of the fluorine introduction amount and a glass body having extremely small variation of a fluorine concentration can be produced.

The reason that a glass body having extremely small variation of a fluorine concentration was obtained is considered due to that the elimination of fluorine was sufficiently suppressed so that the degree of elimination of fluorine is equivalent between the outer peripheral portion and the inside of the porous glass body. It is considered, as described above, that because step (b) was carried out at low temperature of 80° C., HF adsorbing ability of NaF added is high, and as a result, proton sources newly generated in the porous glass body was greatly decreased, and thereby the elimination of fluorine was sufficiently suppressed so that the degree of elimination of fluorine is equivalent between the outer peripheral portion and the inside of the porous glass body.

Furthermore, the obtained cylindrical formed $TiO_2$—$SiO_2$ glass body having a diameter of 140 mm was placed in a carbon mold and kept at 1,700° C. for 4 hours to again carry out the forming, thereby obtaining a block-shaped formed $TiO_2$—$SiO_2$ glass body (step (d)). After it was cooled to 1,000° C. in the furnace without any treatment at 10° C./hr, it was kept at 1,000° C. for 3 hours, cooled to 950° C. at 10° C./hr, kept at 950° C. for 72 hours, cooled to 900° C. at 5° C./hr, kept at 900° C. for 72 hours, and then cooled to room temperature, thereby obtaining a formed $TiO_2$—$SiO_2$ body (step (e)). Regarding the obtained glass, by the above-described method, glass pieces were collected from two sites of the central portion, two sites of the outer peripheral portion and two sites of the intermediate portion, respectively, mirror polishing was carried out, and the fictive temperature of the mirror polished $TiO_2$—$SiO_2$ glass was measured according to the above procedures. As a result, the average fictive temperature at two sites of the central portion was 896° C., the average fictive temperature at two sites of the intermediate portion was 899° C., and the average fictive temperature at two sites of the outer peripheral portion was 901° C. Thus, it was confirmed that a glass body having extremely small variation width $\Delta Tf$ of the fictive temperature of 5° C. can be produced.

This application is based on Japanese patent application No. 2008-259711 filed on Oct. 6, 2008, and the entire contents of which are incorporated hereinto by reference.

INDUSTRIAL APPLICABILITY

The synthetic quartz glass produced by the production process of the present invention is suitable as an optical element and an optical member each being used under ultraviolet light, and an optical element and an optical member each having a controlled refractive index.

Furthermore, the $TiO_2$—$SiO_2$ glass produced by the process of the present invention is suitable as an optical member required an extremely low expansion property, and is particularly suitable as an optical system member (photomask, mirror and the like) of an exposure device for EUV lithography.

The invention claimed is:

1. A process for production of a synthetic quartz glass having a fluorine concentration of 1,000 mass ppm or more, the process comprising:
   (a) depositing and growing quartz glass fine particles obtained by flame hydrolysis of a glass forming raw material onto a substrate, to thereby form a porous glass body;
   (b) keeping the porous glass body in a reaction vessel that is filled with elemental fluorine ($F_2$) or a mixed gas comprising elemental fluorine ($F_2$) diluted with an inert gas and contains a solid metal fluoride, to thereby obtain a fluorine-containing porous glass body; and
   (c) heating the fluorine-containing porous glass body to a transparent vitrification temperature, to thereby obtain a fluorine-containing transparent glass body.

2. The production process according to claim 1, wherein the solid metal fluoride is sodium fluoride.

3. The production process according to claim 1, further comprising subjecting the inside of the reaction vessel to a degassing treatment before filling the inside of the reaction vessel with elemental fluorine ($F_2$) or a mixed gas obtained by diluting elemental fluorine ($F_2$) with an inert gas in (b).

4. The production process according to claim 1, further comprising presintering the porous glass body at from 1,100 to 1,350° C. between (a) and (b).

5. The production process according to claim 1, wherein (b) is carried out a temperature of 200° C. or less.

6. The production process according to claim 1, wherein (b) is carried out a temperature of 150° C. or less.

7. The production process according to claim 1, wherein the inert gas comprises nitrogen, helium or argon.

8. The production process according to claim 1, wherein the transparent vitrification temperature is within the range of from 1,350 to 1,800° C.

9. The production process according to claim 1, wherein the transparent glass body has a fluorine concentration of 3,000 ppm or more.

10. A process for production of a $TiO_2$-containing synthetic quartz glass ($TiO_2$—$SiO_2$ glass) having a fluorine concentration of 1,000 mass ppm or more, the process comprising:
- (a) depositing and growing $TiO_2$—$SiO_2$ glass fine particles obtained by flame hydrolysis of an Si precursor and a Ti precursor each serving as a glass forming raw material onto a substrate, to thereby form a porous $TiO_2$—$SiO_2$ glass body;
- (b) keeping the porous $TiO_2$—$SiO_2$ glass body in a reaction vessel that is filled with elemental fluorine ($F_2$) or a mixed gas comprising elemental fluorine ($F_2$) diluted with an inert gas and contains a solid metal fluoride, to thereby obtain a fluorine-containing porous $TiO_2$—$SiO_2$ glass body; and
- (c) heating the fluorine-containing porous $TiO_2$—$SiO_2$ glass body to a transparent vitrification temperature, to thereby obtain a fluorine-containing transparent $TiO_2$—$SiO_2$ glass body.

11. The production process according to claim 10, wherein the solid metal fluoride is sodium fluoride.

12. The production process according to claim 10, further comprising subjecting the inside of the reaction vessel to a degassing treatment before filling the inside of the reaction vessel with elemental fluorine ($F_2$) or a mixed gas obtained by diluting elemental fluorine ($F_2$) with an inert gas in (b).

13. The production process according to claim 10, further comprising presintering the porous glass body at from 1,100 to 1,350° C. between (a) and (b).

14. The production process according to claim 10, wherein (b) is carried out a temperature of 200° C. or less.

15. The production process according to claim 10, wherein (b) is carried out a temperature of 150° C. or less.

16. The production process according to claim 10, wherein the inert gas comprises nitrogen, helium or argon.

17. The production process according to claim 10, wherein the transparent vitrification temperature is within the range of from 1,350 to 1,800° C.

18. The production process according to claim 10, wherein the transparent $TiO_2$—$SiO_2$ glass body has a fluorine concentration of 3,000 ppm or more.

* * * * *